(12) United States Patent
Shiraishi

(10) Patent No.: US 8,774,511 B2
(45) Date of Patent: Jul. 8, 2014

(54) IMAGE PROCESSING APPARATUS AND IMAGE PROCESSING METHOD

(75) Inventor: Yuki Shiraishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 704 days.

(21) Appl. No.: 12/547,292

(22) Filed: Aug. 25, 2009

(65) Prior Publication Data

US 2010/0054591 A1 Mar. 4, 2010

(30) Foreign Application Priority Data

Aug. 26, 2008 (JP) ................................ 2008-217321

(51) Int. Cl.
*G06K 9/34* (2006.01)
*G06K 9/00* (2006.01)
*G06K 9/46* (2006.01)

(52) U.S. Cl.
USPC ........................... 382/173; 382/168; 382/190

(58) Field of Classification Search
None
See application file for complete search history.

(56) References Cited

U.S. PATENT DOCUMENTS

| | | | |
|---|---|---|---|
| 5,680,478 A | 10/1997 | Wang | |
| 6,404,921 B1 | 6/2002 | Ishida | |
| 6,731,792 B1* | 5/2004 | Tanaka | 382/164 |
| 8,611,658 B2* | 12/2013 | Yamazaki | 382/173 |
| 2004/0066969 A1* | 4/2004 | Aihara | 382/173 |
| 2005/0238244 A1 | 10/2005 | Uzawa | |
| 2007/0025617 A1* | 2/2007 | Dai et al. | 382/180 |
| 2007/0237422 A1* | 10/2007 | Zhou et al. | 382/284 |
| 2008/0123119 A1* | 5/2008 | Hagiwara | 358/1.9 |
| 2008/0123945 A1 | 5/2008 | Andrew | |

FOREIGN PATENT DOCUMENTS

| | | |
|---|---|---|
| JP | 2004-350240 | 12/2004 |
| WO | 2006/066325 | 6/2006 |

* cited by examiner

*Primary Examiner* — Amir Alavi
*Assistant Examiner* — Kenny Cese
(74) *Attorney, Agent, or Firm* — Canon USA Inc. IP Division

(57) ABSTRACT

An image processing apparatus includes an input unit for inputting image data, an attribute information generation unit for generating attribute information about each pixel of the image data, a block division unit for dividing the image data into a plurality of blocks of a predetermined size, a histogram generation unit for generating a histogram of colors and the number of pixels of each color existing in a focused block divided by the division unit, and a color replacement unit, if it is not determined that the area having the focused color is a significant area, for replacing a color of a pixel existing within the area having the focused color with a different color so that the color of the area having the focused color becomes the same as the color of another area contacting the area having the focused color and having the different color according to a predetermined condition.

7 Claims, 15 Drawing Sheets

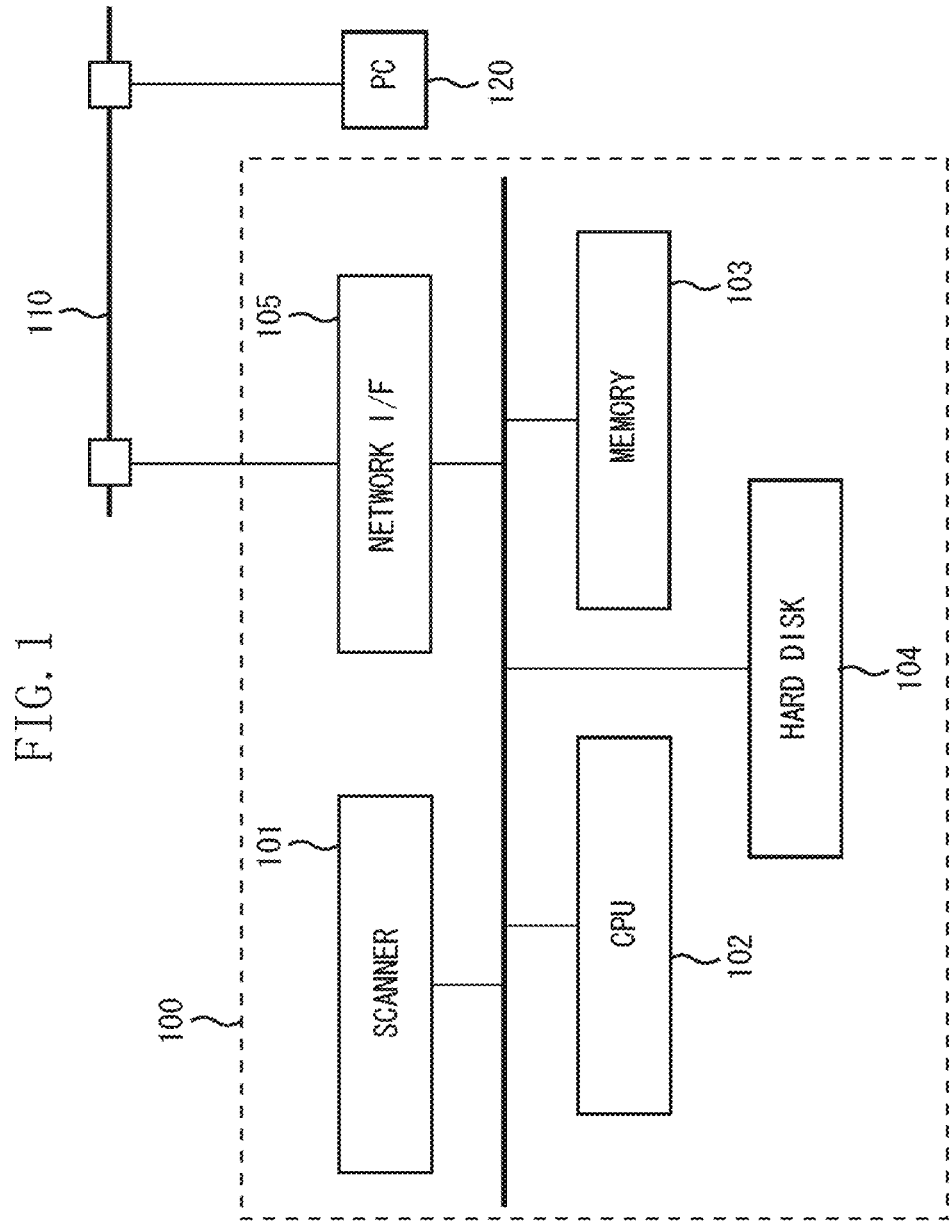

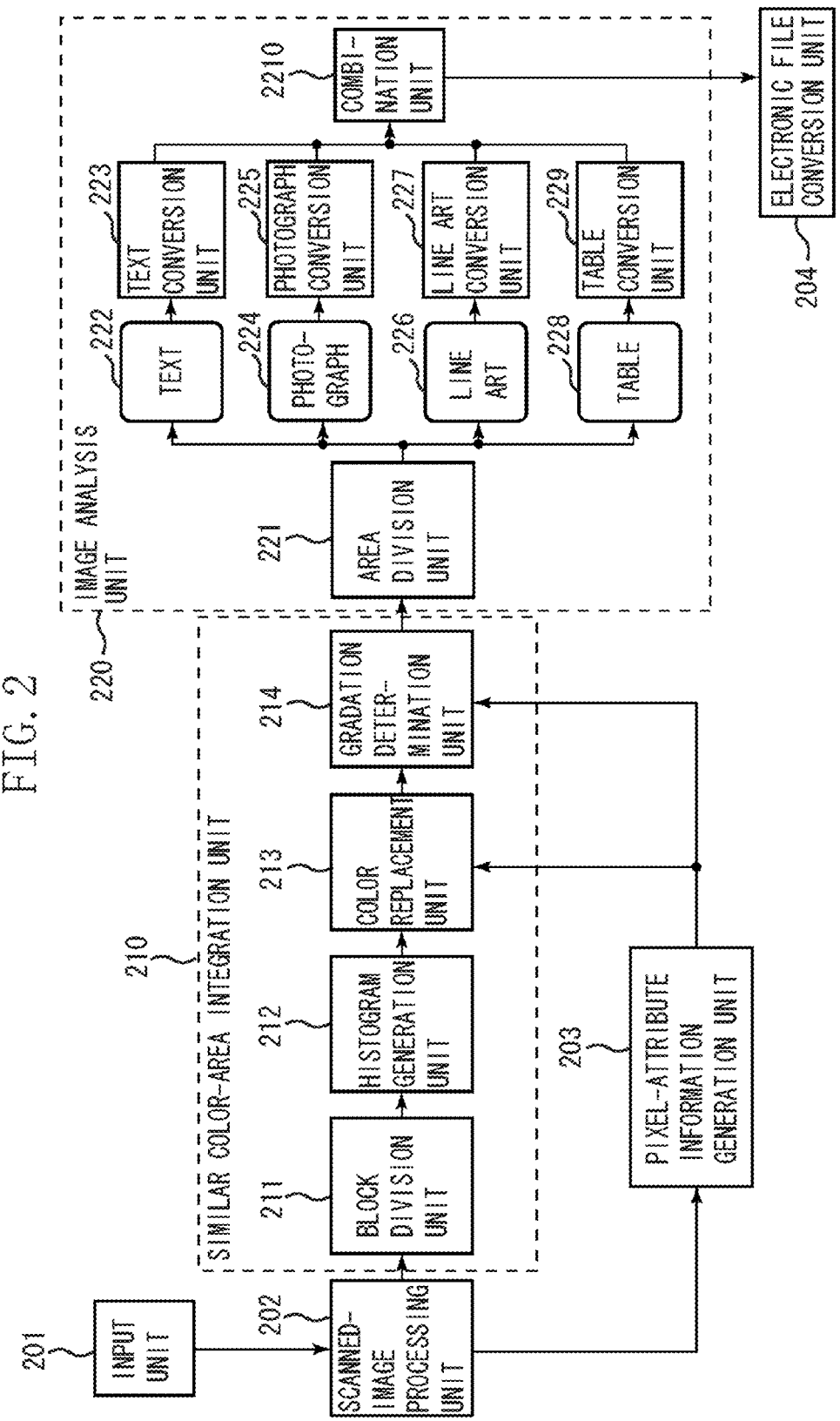

FIG. 3A
FIG. 3B

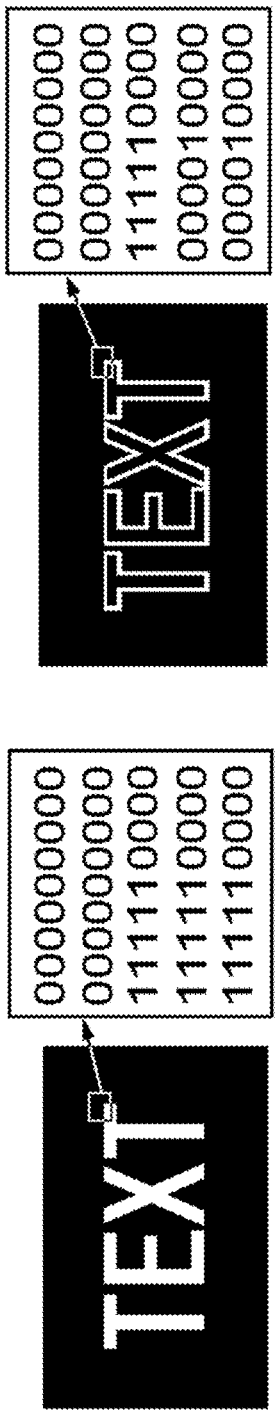

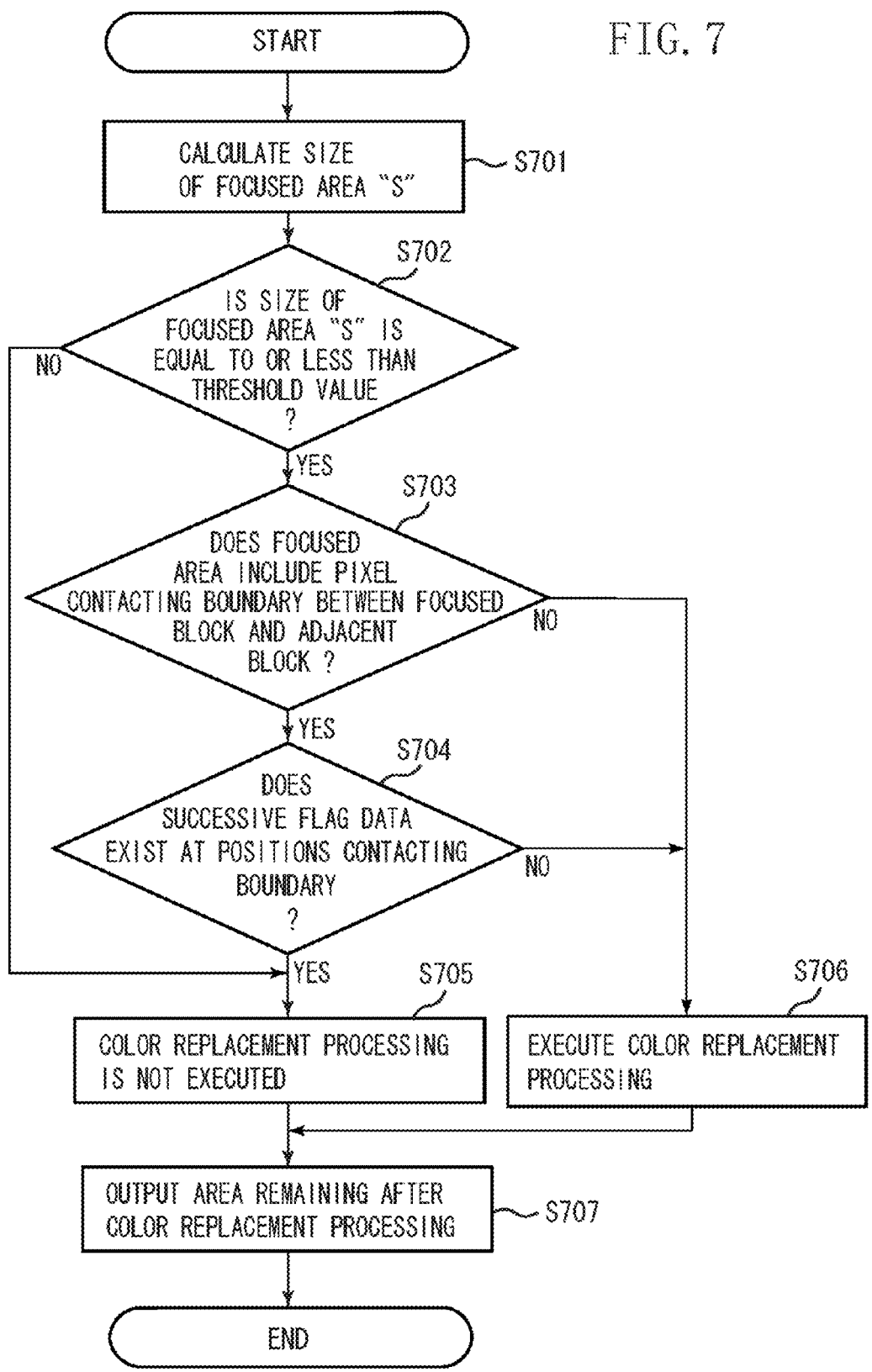

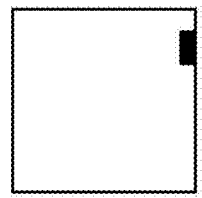
FIG. 8A
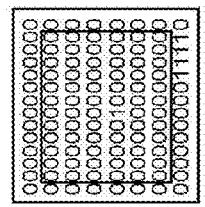
FIG. 8B
FIG. 8C
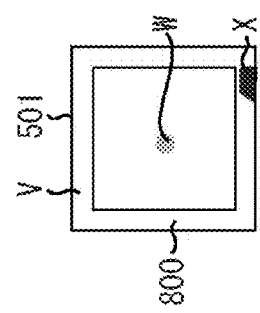
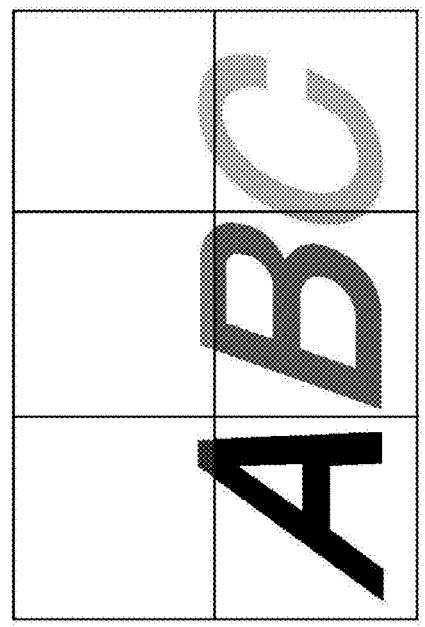
FIG. 8D

FIG. 17

| SYMBOL | CODE |
|---|---|
| 255 | 1 1 1   1 1 1 0 |
| 254 | 1 1 1   1 1 0 0 |
| ⋮ | ⋮ |
| 3 | 1 1 1 0 0 |
| 2 | 1 1 0 0 |
| 1 | 1 0 0 |
| 0 | 0 0 |
| −1 | 0 1 |
| −2 | 1 0 1 |
| −3 | 1 1 0 1 |
| ⋮ | ⋮ |
| −254 | 1 1 1   1 1 0 1 |
| −255 | 1 1 1   1 1 1 1 |

IMAGE PROCESSING APPARATUS AND IMAGE PROCESSING METHOD

BACKGROUND OF THE INVENTION

1. Field of the Invention

The present invention relates to an image processing apparatus and method for extracting each element, such as a character (text) or a photograph, from image data.

2. Description of the Related Art

As a technique for extracting an element of image data, such as a text or a photograph, from image data, International Publication WO 2006/066325 discusses a method for dividing an input image into a plurality of blocks and executing color replacement on each block.

If an image is divided into a plurality of blocks, an area that belongs to one entire area may be determined as a small isolated area due to the division.

More specifically, the method discussed in International Publication WO 2006/066325 may delete the above-described small area as a result of erroneously determining that the small area is noise or may determine the area, which belongs to one entire area, as an isolated area.

SUMMARY OF THE INVENTION

According to an aspect of the present invention, an image processing apparatus includes an input unit configured to input image data, an attribute information generation unit configured to generate attribute information about each pixel of the image data input by the input unit, a division unit configured to divide the image data input by the input unit into a plurality of blocks of a predetermined size, a generation unit configured to generate a histogram of colors and the number of pixels of each color existing in a focused block divided by the division unit, a first determination unit configured, if a size of an area having a focused color calculated based on the histogram generated by the generation unit is greater than a predetermined threshold value, to determine that the area having the focused color is a significant area, a second determination unit configured, if the size of the area having the focused color is equal to or less than a predetermined threshold value, if the area having the focused color is located on a boundary of the focused block, and if the attribute information generated by the attribute information generation unit about a pixel existing within the area having the focused color and located on the boundary includes a predetermined attribute, to determine that the area having the focused color is a significant area, and a color replacement unit configured, if it is not determined by either one of the first determination unit and the second determination unit that the area having the focused color is a significant area, to replace a color of the pixel existing within the area having the focused color with a different color so that the color of the area having the focused color becomes the same as the color of another area contacting the area having the focused color and having the different color.

According to another aspect of the present invention, an image processing method includes inputting image data, generating attribute information about each pixel of the input image data, dividing the input image data into a plurality of blocks of a predetermined size, generating a histogram of colors and the number of pixels of each color existing in a divided focused block, determining, if a size of an area having a focused color calculated based on the generated histogram is greater than a predetermined threshold value, that the area having the focused color is a significant area, determining, if the size of the area having the focused color is equal to or less than the predetermined threshold value, if the area having the focused color is located on a boundary of the focused block, and if the generated attribute information about a pixel existing within the area having the focused color and located on the boundary includes a predetermined attribute, that the area having the focused color is a significant area, and executing color replacement processing, if it is not determined that the area having the focused color is a significant area, on the pixel existing within the area having the focused color with a different color so that the color of the area having the focused color becomes the same as the color of another area contacting the area having the focused color and having the different color.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

FIG. 1 is a block diagram illustrating an exemplary functional configuration of an image processing system according to a first exemplary embodiment of the present invention.

FIG. 2 is a block diagram illustrating an exemplary functional configuration of an image processing apparatus 100 according to the first exemplary embodiment of the present invention.

FIG. 3A illustrates an example of input image data and FIG. 3B illustrates an example of attribute data generated based on the input image data according to an exemplary embodiment of the present invention.

FIG. 4A illustrates the attribute data generated as illustrated in FIG. 3B as flag data, and FIG. 4B illustrates an exemplary modification of the flag data illustrated in FIG. 4A according to an exemplary embodiment of the present invention.

FIG. 7 is a flow chart illustrating an example of processing executed by a color replacement unit 213 according to an exemplary embodiment of the present invention.

FIG. 8A illustrates an example of the block 501, FIG. 8B illustrates an example of flag data of the block 501, FIG. 8C illustrates an example of a pixel area 800 after color replacement, and FIG. 8D illustrates an example of the image 500 after the color replacement according to an exemplary embodiment of the present invention.

FIG. 17 illustrates an example of a Huffman table stored on a memory 1504 according to an exemplary embodiment of the present invention.

DESCRIPTION OF THE EMBODIMENTS

Figure 5A:
FIG. 5A illustrates an example of an image 500 input to a similar color-area integration unit 210.

Now, a first exemplary embodiment of the present invention will be described in detail below. FIG. 1 illustrates an exemplary functional configuration of an image processing system according to a first exemplary embodiment of the present invention.

Referring to FIG. 1, an image processing apparatus 100 includes a scanner 101, a central processing unit (CPU) 102, a memory 103, a hard disk 104, and a network interface (I/F) 105. The scanner 101 converts information about a scanned document sheet into image data. The CPU 102 executes a program for executing processing according to the present invention on image data. The memory 103 functions as a work memory and a temporary data storage area when executing a program. The hard disk 104 stores a program and data. The network interface (I/F) 105 is used for executing data communication with an external apparatus.

A personal computer (PC) 120 is connected with the image processing apparatus 100 via a network, such as a local area network (LAN) 110. The PC 120 receives data transmitted from the image processing apparatus.

FIG. 2 illustrates an exemplary functional configuration of the image processing apparatus 100 according to the present exemplary embodiment. In the present exemplary embodiment, each processing illustrated in FIG. 2 is implemented by the CPU 102 by executing an electronic document generation program. However, the present exemplary embodiment is not limited to this. More specifically, it is also useful if a part of or the entire processing is constituted by an electronic circuit.

Referring to FIG. 2, an input unit 201 inputs a document using the scanner 101. A scanned-image processing unit 202 digitizes (converts the scanned document image into image data) the document to generate image data. A pixel-attribute information generation unit 203 generates attribute data of each pixel.

"Each pixel-attribute information (data)" refers to a signal that indicates an image area attribute of each pixel (hereinafter simply referred to as "flag data"), which is acquired by extracting a characteristic of a document image in order to execute optimum image processing according to a characteristic of an image included in a document image. More specifically, a document image read by an image scanner may include various image areas, such as a full color photograph area having a continuous gradation, a text area including a single color of black, or a halftone dot print area as in newspaper printing.

If an image having various image areas is output by equally executing the same image processing thereon, then the quality of a resulting output image may be low. Accordingly, the present exemplary embodiment detects an attribute of image data included in an original image using color image data input by the input unit 201 and generates flag data. "Flag data" is used for identifying the attribute of image data.

A method discussed in Japanese Patent Application Laid-Open No. 2004-350240 can be used for executing the above-described processing. More specifically, the following processing is executed for a text attribute. Image data is serially focused on in order of rasterization scanning. Then, pixels existing in a specific range (e.g., 7×7 pixel area) from a target pixel (i.e. a focused pixel) is subjected to filtering using the Laplacian filtering method. If the value of the focused pixel is greater than a predetermined threshold value, then it is determined that the pixel constitutes an edge.

In detecting a character (text), because a text is mainly constituted by a line, a text area can be efficiently detected by using a filter for a relatively low frequency in a specific direction.

If a predetermined or greater number of pixels that have been determined to be edges of a character are included in a specific area in the vicinity of a focused pixel, then a corresponding text flag is set for the focused pixel as a pixel existing in a text area. As a matter of course, various attribute data, such as a halftone dot attribute or a graphic attribute, is generated in addition to the text attribute by the image processing.

In addition to using attribute data acquired by using an image scanner, it is also useful to refer to information indicating the type of a page description language (PDL) command when generating a print image by interpreting a PDL command from PDL data. In this case, flag data for identifying a pixel constituting a text area is detected for each pixel.

Regardless of which of the above-described attribute data and the PDL command type information is used, the data or the information is a signal that outputs 1-byte data including a value "1", which indicates that the attribute of a pixel is the text attribute, or a value "0", which indicates that the attribute of the pixel is an attribute other than the text attribute.

FIG. 3A illustrates an example of input image data. FIG. 3B illustrates an example of attribute data generated based on the input image data illustrated in FIG. 3A. FIG. 4A illustrates the attribute data generated as illustrated in FIG. 3B in the form of flag data. FIG. 4B illustrates an example of a modification of the flag data illustrated in FIG. 4A.

If, for example, the image data illustrated in FIG. 3A is input, attribute data for each pixel illustrated in FIG. 3B is generated as well as the image data. The attribute data generated in the above-described manner is information whose black portion indicates a value "0" while whose white portion indicates a value "1" as illustrated in FIG. 4A.

In the present exemplary embodiment, each pixel-attribute data is information indicating the entire text area. However, the present invention is not limited to this. More specifically, it is also useful if each pixel-attribute data is information indicating an edge of a text only.

Referring to FIG. 2, a similar color-area integration unit 210 executes color replacement processing on a color image and divides the color-replaced color image into similar color-areas. Scan noise and mosquito noise may be additionally included in an input image. In this case, the tint of areas of the input image, whose colors have been the same, may become slightly different depending on areas. Accordingly, the similar color-area integration unit 210 acquires statistics of color information of the areas and executes color replacement of similar colors.

The similar color-area integration unit 210 includes a block division unit 211, a histogram generation unit 212, a color replacement unit 213, a gradation determination unit 214, and a block integration unit 214.

The block division unit 211 divides the image data input via the input unit 201 into a plurality of blocks of a predetermined size. The histogram generation unit 212 generates a histogram of the colors and the number of pixels of each color existing within the focused block divided by the block division unit 211 (i.e. the histogram indicates a relation between the colors and the number of pixels of each color).

The color replacement unit 213 replaces the color of a pixel in the area having a focused color with a different color according to a predetermined condition, which will be described in detail below, in order to integrate the area having the focused color and an area of a different color that contacts the focused color area.

If a predetermined condition, which will be described in detail below, is satisfied, the block integration unit 214 integrates the focused area and the area existing within a block that is in contact with the focused area. In the present exemplary embodiment, the color replacement unit 213 also functions as a first determination unit and a second determination unit that determine an area having a focused color as a significant area, as will be described in detail below.

Figure 5B:
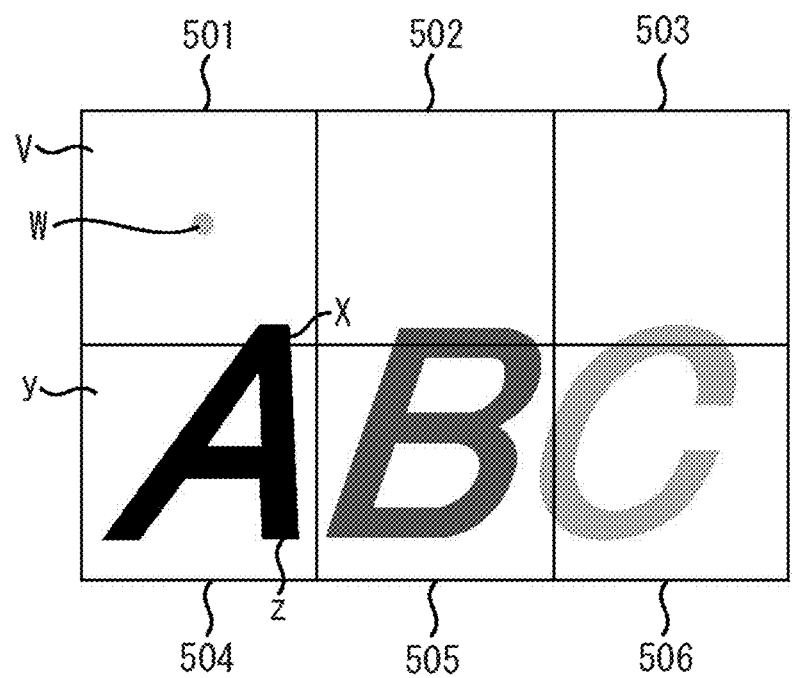
FIG. 5B illustrates an example of a state in which the image 500 is divided by a block division unit 211 according to an exemplary embodiment of the present invention.
Figure 6A:
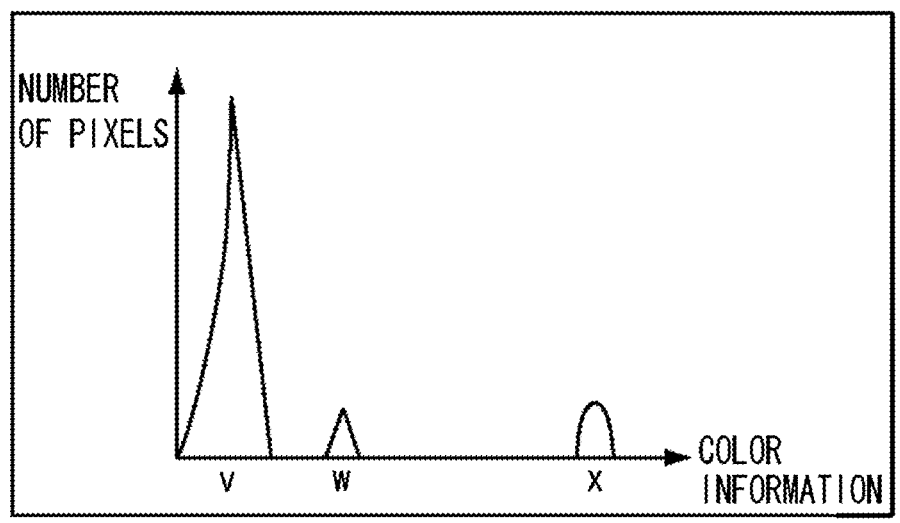
FIG. 6A schematically illustrates an exemplary distribution of color information about a block 501 illustrated in FIG. 5B, and FIG. 6B schematically illustrates an exemplary distribution of color information about a block 504 illustrated in FIG. 5B according to an exemplary embodiment of the present invention.
Figure 6B:
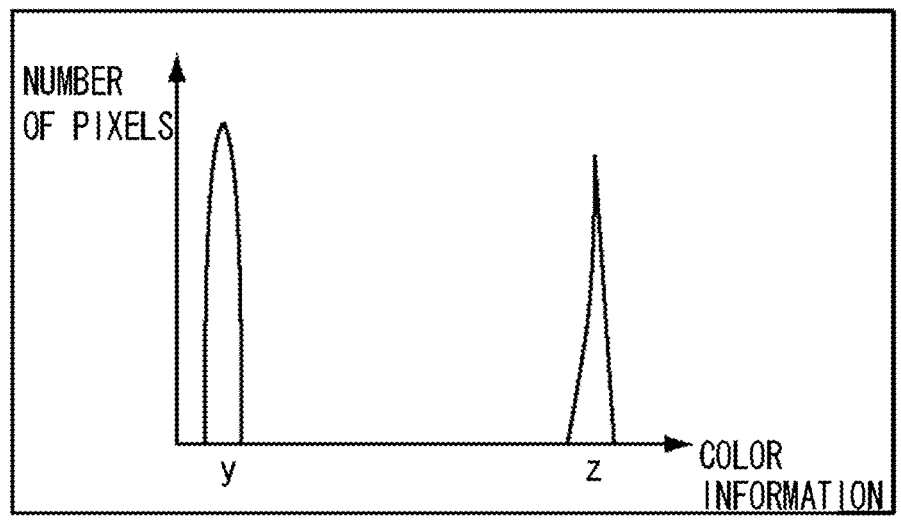

FIG. 5A illustrates an example of an image 500, which is input to the similar color-area integration unit 210. FIG. 5B illustrates an example of a state of the image 500 divided by the block division unit 211. FIG. 6A schematically illustrates an example of a distribution of color information about the block 501, which is illustrated in FIG. 5B. FIG. 6B schematically illustrates an example of the distribution of color information about a block 504, which is illustrated in FIG. 5B.

In the present exemplary embodiment, as illustrated in FIG. 5B, longitudinal and lateral sizes of a block are constant. More specifically, the block division unit 211 divides a block into six blocks 501 through 506. Furthermore, the histogram generation unit 212 extracts color information of each block by using a publicly known method. In the present exemplary embodiment, the histogram generation unit 212 extracts color information and the statistical distribution thereof.

The color replacement unit 213 performs the color replacement of the pixel in a block according to the color information acquired in the above-described manner. Now, an operation of the color replacement unit 213 will be described in detail below with reference to FIG. 7.

FIGS. 7 illustrates an example of the operation of the color replacement unit 213 according to the present exemplary embodiment. FIG. 8A illustrates an example of the block 501. FIG. 8B illustrates an example of the flag data of the block 501. FIG. 8C illustrates an example of a pixel area 800 after color replacement. FIG. 8D illustrates an example of the image 500 after color replacement.

Referring to FIG. 7, in step S701, the color replacement unit 213 calculates the size of a focused area "S" having a focused color determined according to a histogram generated by the histogram generation unit 212. More specifically, the color replacement unit 213 calculates the number of pixels by grouping areas having similar color information according to the above-described color information distribution.

In step S702, the color replacement unit 213 determines whether the size of the focused area "S" is equal to or less than a previously set threshold value (S≤th1). If it is determined that the size of the focused area is greater than the threshold value Th1 in step S702 (NO in step S702), then, the processing advances to step S705. In step S705, the color replacement unit 213 determines the area having the focused color as a significant area. Then, the color replacement unit 213 does not execute the color replacement processing and determines the area as an independent area.

In the case of the block 501 as illustrated in FIG. 5, the size of an area v is greater than the threshold value Th1 (NO in step S702). Accordingly, the processing advances to step S705. On the other hand, the size of each of areas w and x is equal to or less than the threshold value Th1 (YES in step S702). Accordingly, the processing advances to step S703. Furthermore, in the case of the block 504, the size of each of areas y and z is greater than the threshold value Th1 (NO in step S702). Accordingly, the processing advances to step S705.

Generally, a conventional method determines an area with a small size as noise and replaces the color of the small area with the color of a different other area. However, even if the size of an area is small within a block, the area may not always be noise if the area is divided by a boundary between blocks. Accordingly, the present exemplary embodiment executes the processing in step S703 and subsequent processing.

In step S703, the color replacement unit 213 determines whether the focused area includes a pixel contacting the boundary between the focused block and adjacent blocks. In spite of that, it is also useful if the color replacement unit 213 determines whether the focused area includes a pixel existing in an area located inside the boundary by a distance equivalent to pixels of a predetermined specific range.

If it is determined that the focused area includes a pixel contacting the boundary between the focused block and an adjacent block (YES in step S703), then the processing advances to step S704. On the other hand, if it is determined that the focused area does not include a pixel contacting the boundary between the focused block and an adjacent block (NO in step S703), then the processing advances to step S706.

In the present exemplary embodiment, the pixel area 800 illustrated in FIG. 8A is a pixel area that is determined to be an edge of the focused block 501. The area w, among the areas w and x of the block 501, is not included in the pixel area 800 (NO in step S703). Accordingly, the processing advances to step S706. With respect to the area x, which is included in the pixel area 800 (YES in step S703), the processing advances to step S704.

In step S704, the color replacement unit 213 refers to the flag data generated by the pixel-attribute information generation unit 203 and determines whether successive flag data exists in an area that is in contact with the boundary exists. If it is determined that successive flag data exists in an area that is in contact with the boundary (YES in step S704), then the processing advances to step S705.

On the other hand, if it is determined that successive flag data does not exist in an area that is in contact with the boundary (NO in step S704), then the processing advances to step S706. In the processing in step S704, it is determined whether "successive" flag data exists in addition to determining whether flag data exists. Thus, the present exemplary embodiment can prevent erroneously recognizing the area as noise.

In the example illustrated in FIG. 8B, the successive flags having a value "1" exist in the position corresponding to the area x of the block 501. Accordingly, the processing advances to step S705. Instep S705, the color replacement unit 213 processes the area as an independent area.

After color-replacing the pixel area 800 in the above-described manner, the state of the pixel area 800 becomes the example illustrated in FIG. 8C. The area w, which has been recognized as scan noise, is replaced with a color of an adjacent area. The area x, which was a large area before the division and has been divided into a small area by the block division, remains as it is as an independent area. Accordingly, the area x is not subjected to color replacement processing.

In step S707, the color replacement unit 213 outputs the area remaining after the color replacement processing. As a result, the state of the image 500 becomes as illustrated in FIG. 8D. Then, the block integration unit 214 integrates the area that has been subjected to the block-by-block color replacement processing by the color replacement unit 213 with a similar color-area of an adjacent block.

Now, exemplary processing executed by the block integration unit 214 will be described in detail below with reference to FIG. 9.

Figure 9:
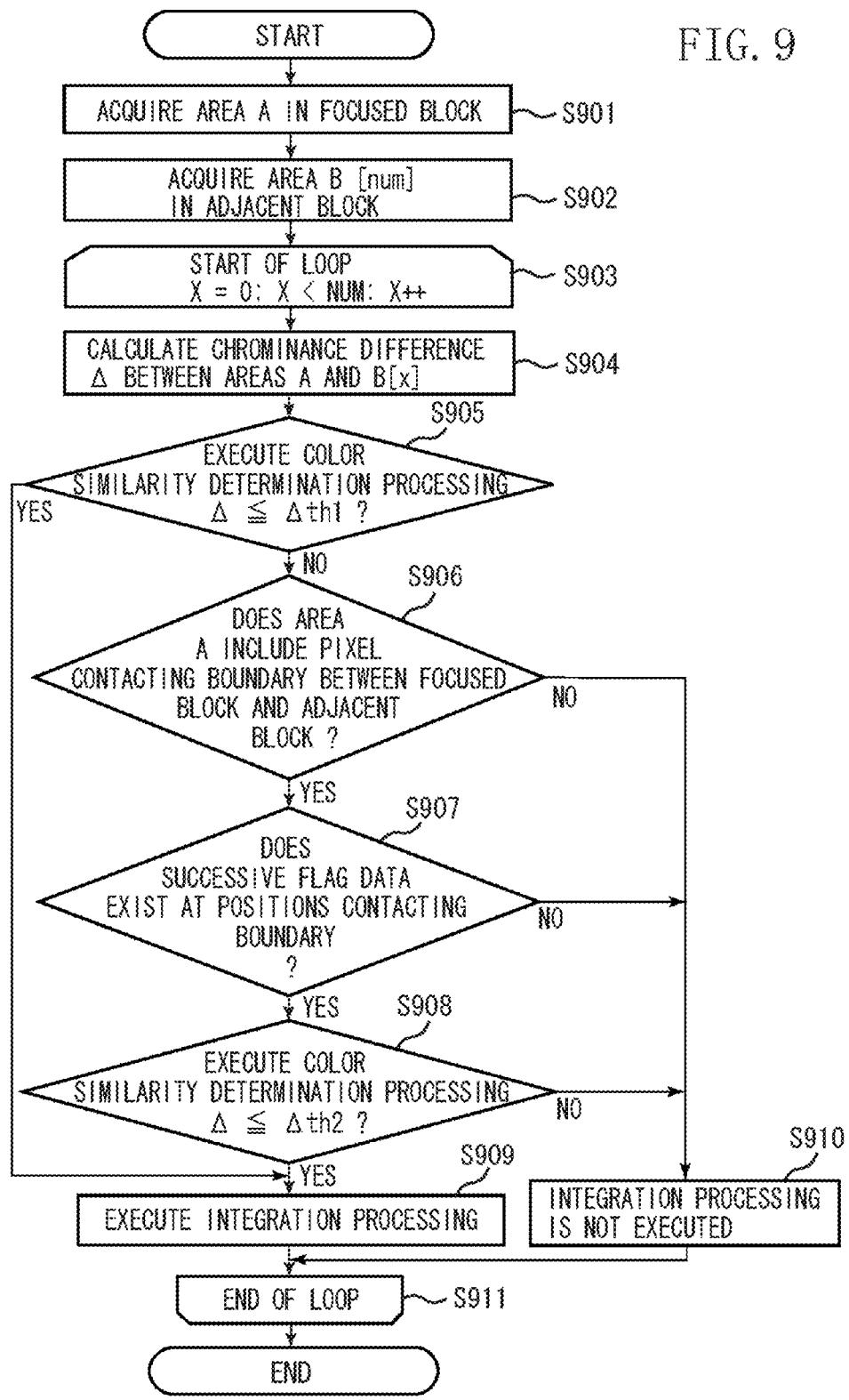
FIG. 9 is a flow chart illustrating exemplary processing executed by a block integration unit 214 according to the first exemplary embodiment of the present invention.
Figure 10A:
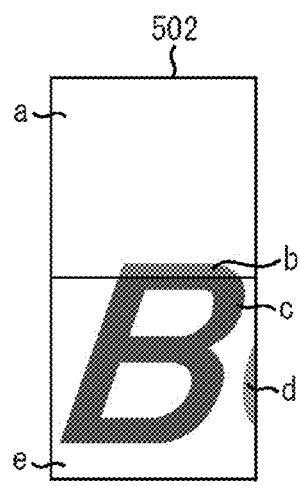
FIG. 10A illustrates an example of an area remaining after color replacement on a focused block and an adjacent block and FIG. 10B is a graph schematically illustrating color information, in a color space, of the area remaining after the color conversion according to an exemplary embodiment of the present invention.
Figure 10B:
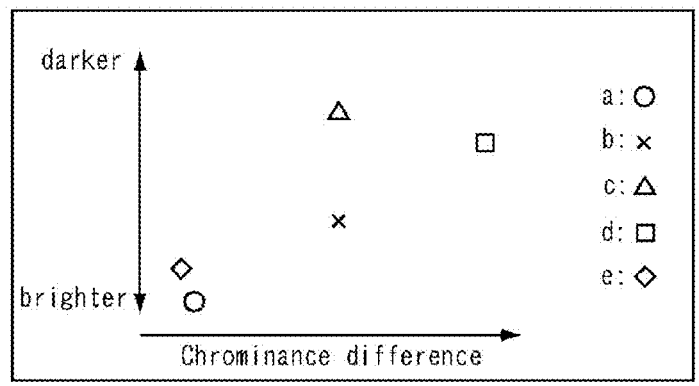
Figures 11A, 11B:
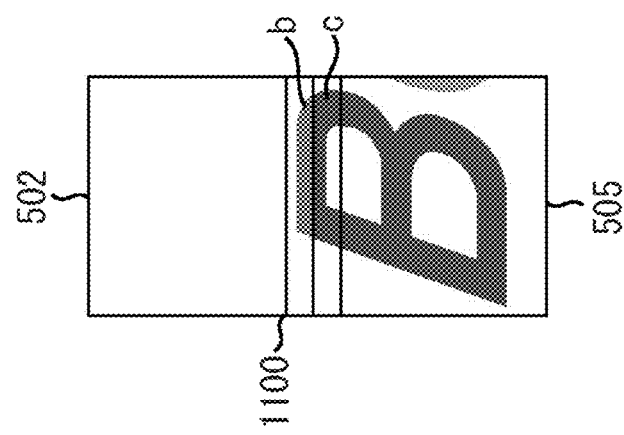
FIG. 11A illustrates an example of an area remaining after color replacement on a focused block and an adjacent block and FIG. 11B illustrates an example of flag data of the area illustrated in FIG. 11A according to an exemplary embodiment of the present invention.

FIG. 9 is a flow chart illustrating exemplary processing executed by the block integration unit 214 according to the present exemplary embodiment. FIG. 10A illustrates an example of an area remaining after color replacement on a focused block and an adjacent block. FIG. 10B is a graph schematically illustrating color information of the area remaining after the color replacement in a color space. FIG. 11A illustrates an example of an area remaining after color replacement on a focused block and an adjacent block. FIG. 11B illustrates an example of flag data of the area illustrated in FIG. 11A.

Referring to FIG. 9, in step S901, the block integration unit 214 acquires a focused area A that has been output from the color replacement unit 213. An area A is an area determined by either one of the first and the second determination units as a significant area.

In step S902, the block integration unit 214 acquires an area B[num] that has been determined to be significant in another block adjacent to the focused block including the area A.

In the present exemplary embodiment, an "adjacent block" refers to a block contacting a focused block (i.e., a block to be processed) on top or on the left thereof. More specifically, if the block to be processed is the block 505 (FIG. 5B), the blocks 502 and 504 are adjacent blocks.

In step S903, the block integration unit 214 issues a command for starting loop of processing for executing processing in step S904 and subsequent steps on the entire areas of the adjacent blocks that has been acquired in step S902.

In step S904, the block integration unit 214 calculates the chrominance difference between the color information about the areas A and B. A publicly known method can be used in calculating the chrominance difference. In the present exemplary embodiment, the block integration unit 214 calculates a relative distance between the color information in a general color space.

In step S905, the block integration unit 214 determines whether the color information about the area "A" and the area B[xs] is similar to each other. More specifically, the block integration unit 214 determines whether the chrominance difference calculated in step S904 is equal to or less than a predetermined threshold value.

If it is determined that the color information is similar to each other (YES in step S905), then the processing advances to step S909. Instep S909, the block integration unit 214 executes integration processing. On the other hand, if it is determined that the color information is not similar to each other (NO in step S905), then the processing advances to step S906.

As illustrated in FIG. 10B, the brightness of color information about an area "a" of the block 502 is substantially similar to that of an area "e" of the block 505 (i.e., almost no chrominance difference exists between the areas "a" and "e"). Therefore, as illustrated in FIG. 10A, the block integration unit 214 determines that the color information about the areas "a" and "e" is similar to each other. In this case, the processing advances to the integration processing in step S909.

On the other hand, the brightness of color information about an area "b" of the block 502 is not similar to that of an area "c" of the block 505 (NO in step S905). Therefore, the block integration unit 214 determines that the color information is not similar to each other. In this case, the processing advances to step S906 as described above.

In step S906, the block integration unit 214 determines whether the focused area includes a pixel that is in contact with the boundary between the focused block and an adjacent block. If it is determined that the focused area includes a pixel that is in contact with the boundary between the focused block and an adjacent block (YES in step S906), then the processing advances to step S907. On the other hand, if it is determined that the focused area does not include a pixel that is in contact with the boundary between the focused block and an adjacent block (NO in step S906), then the processing advances to step S910.

As illustrated in FIG. 11A, the area "b" includes a pixel that is in contact with a boundary 1100 between the focused block 502 and an adjacent block 505, which is adjacent to the focused block 502 (YES in step S906). Accordingly, the processing advances to step S907.

In step S907, the block integration unit 214 refers to the flag data generated in the area B[x] by the pixel-attribute information generation unit 203 and determines whether successive flag data exists at a location in contact with the boundary.

If it is determined that successive flag data exists at a location that is in contact with the boundary (YES in step S907), then the processing advances to step S908. On the other hand, if it is determined that successive flag data does not exist at a location that is in contact with the boundary (NO in step S907), then the processing advances to step S910. In the processing in step S907, it is determined whether "successive" flag data exists not only determining whether flag data exists. Thus, the present exemplary embodiment can prevent erroneously recognizing the area as noise.

FIG. 11B illustrates an example of flag data existing at a location that is in contact with the boundary 1100. In the example illustrated in FIG. 11B, successive flag data having a value "1" exists in the vicinity of the area "b" (YES in step S9070). Accordingly, the processing advances to step S908.

At this stage of processing, the area B[x] is a part of an area. However, after the area "B" is divided into a plurality of small areas by block division processing, a result of color replacement may be affected by the color information dominantly existing within the block during the color replacement processing.

Therefore, in step S908, the block integration unit 214 changes a threshold value Th1 to a different threshold value Th2 and uses the threshold value Th2 to determine whether the colors are similar to each other.

More specifically, in step S908, the block integration unit 214 determines whether the color information about the areas "A" and B[x] is similar to each other again.

With respect to an area "b" of the block 502 (FIG. 10A), the threshold value Th2 is calculated by assigning weights to the threshold value Th1 with a distance (chrominance difference) of the brightness of the color information about the area "a", which has an area largest of those in the focused block, in a direction opposite to the area "a" in the graph illustrated in FIG. 10B.

If it is determined that the color information is similar to each other (YES in step S908), then the processing advances to step S909. In step S909, the block integration unit 214 executes the integration processing. On the other hand, if it is determined that the color information is not similar to each other (NO in step S908), then the processing advances to step S910 and the block integration unit 214 does not execute the integration processing.

Figure 12:
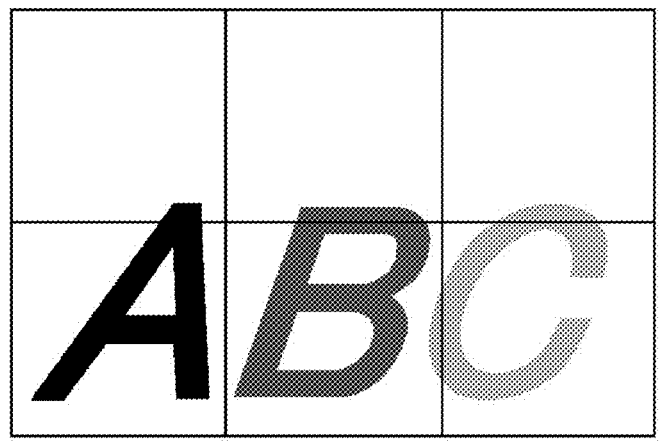
FIG. 12 illustrates an exemplary state of an image 500 after blocks are integrated according to an exemplary embodiment of the present invention.

FIG. 12 illustrates an exemplary state of the image 500 after blocks are integrated. A character (text) illustrated in FIG. 12 is different from the text illustrated in FIG. 8B in a point that areas that have been divided by the block boundary and whose results of the color replacement differ from each other have been integrated. Then, character information (text information) illustrated in FIG. 12 is input to an image analysis unit 220.

The image analysis unit 220 includes an area division unit 221, a text conversion unit 223, a photograph conversion unit 225, a line art conversion unit 227, a table conversion unit 229, and a combination unit 2210, which is configured to combine results of the conversion by the above-described conversion units 223, 225, 227, and 229.

The area division unit 221 divides image data into a text area, a photograph area, a line art area, and a table area by using a publicly known method for dividing an area. More specifically, a method discussed in U.S. Pat. No. 5,680,478 can be used as the area division method.

U.S. Pat. No. 5,680,478 discusses a method for extracting an aggregate of black pixel groups and white pixel groups in a document image to extract a characteristic area, such as a text area, an (a line) art area, a graphic area, a table area, a frame area, or a line area according to the shape, the magnitude, and the state of the aggregate.

The present exemplary embodiment uses either of the method discussed in U.S. Pat. No. 5,680,478, a method for extracting a characteristic amount used in area division processing by extracting a similar color-pixel aggregate from an input multi valued image, a method for extracting a characteristic amount used in area division processing according to a black pixel group acquired by binarizing a multi valued image, or a method for extracting a characteristic amount used in area division processing by extracting differentiation edge information generated based on a multi valued image as a pixel within an edge.

The area division unit 221 executes corresponding conversion on each area divided into a text area, a photograph area, a line art area, or a table area. More specifically, the text conversion unit 223 executes character recognition on each text area by using a publicly known character recognition method to generate character (text) code data.

Now, an example of the character recognition method will be described in detail below. At first, determination in the direction of lines of the text area is executed (i.e., the orientation of writing on the document is determined). The orientation of writing on a document can be determined according to vertical and horizontal projection values acquired from a binarized image. In this case, an orientation having a relatively low distribution of projection can be determined as the line writing direction.

Then, the image is divided into text image areas. The image can be divided into text images in the following manner. More specifically, at first, the image is divided into line images according to a space between lines, along which the image is to be divided, based on a projection of a binary image in the line writing direction. Then each line image is divided into text images (character images) according to a space between characters, along which the line image is to be divided, based on a projection in a direction perpendicular to the line.

In addition, a characteristic of each text image is acquired. Then, a characteristic, among characteristics stored in a dictionary file storing characteristics of all character types, which is most similar to the characteristic of the text image, is extracted. Then, the character code described in the dictionary file is used as a result of recognition of each character. Furthermore, the photograph conversion unit 225 generates a high image-quality raster data by using publicly known high resolution conversion processing.

The line art conversion unit 227 generates vector drawing data of a line art based on image data of a line art by using a publicly known vectorization method. A method discussed in U.S. Pat. No. 6,404,921 or U.S. Patent Application Publication No. 2005/0238244 can be used as the vectorization method.

The method discussed in U.S. Pat. No. 6,404,921 extracts inter-pixel vectors in the horizontal and vertical directions according to a state of a focused pixel and pixels existing adjacent thereto while rasterization-scanning the image. Then, the method discussed in U.S. Pat. No. 6,404,921 extracts an outline of the image data according to the state of contact among the inter-pixel vectors to generate an outline vector (i.e., surrounding of the connected pixel data), which is described in an aggregate of inter-pixel vectors.

U.S. Patent Application Publication No. 2005/0238244 discusses a method for generating vector description data having a high-quality image when greatly magnified by approximating an outline vector by using a straight line or a two- or three-dimensional Bézier curve.

The table conversion unit 229 generates vector drawing data by the publicly known vectorization method described above by executing processing on ruled line portions. In addition, the table conversion unit 229 generates character (text) code data by executing the above-described publicly known character recognition method on text areas.

In the present exemplary embodiment, the text conversion unit 223, the photograph conversion unit 225, the line art conversion unit 227, and the table conversion unit 229 execute the above-described processing. However, the present exemplary embodiment is not limited to this. More specifically, for example, the text conversion unit 223 can execute vector conversion or high-quality image raster data conversion. Furthermore, the table conversion unit 229 can generate high-quality image raster data.

Figure 13:
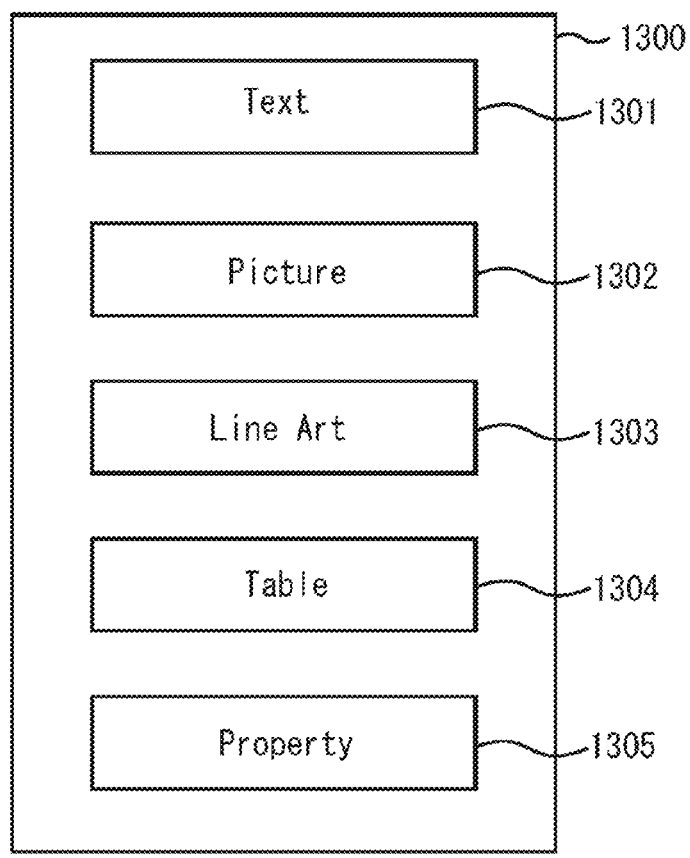
FIG. 13 illustrates an example of data combined by a combination unit 2210 according to an exemplary embodiment of the present invention.

The combination unit 2210 combines data generated by each conversion unit into one piece of data. FIG. 13 illustrates an example of the data combined by the combination unit 2210 according to the present exemplary embodiment.

Referring to FIG. 13, the entire data 1300, which is generated by the combination unit 2210, includes a "text" portion 1301 that stores a result of conversion of the area determined by the area division unit 221 to be a text area and positional information of the text area within the image.

Similarly, a "picture" portion 1302, a "line art" portion 1303, and a "table" portion 1304 stores a result of conversion of the area determined by the area division unit 221 to be a photograph, a line art, or a table area and positional information of the photograph area, the line art area, or the table area within the image, respectively. A "property" portion 1305 stores bibliographic information, such as the number of pages, a page size, input-device information, time stamp information of the input data.

The electronic file conversion unit 204 converts combined data into an electronic file. More specifically, in the present exemplary embodiment, the electronic file conversion unit 204 converts combined data into an electronic file that can be reproduced and edited on the PC 120.

As described above, if the area remaining after the color replacement is a pixel located at the boundary between blocks and if successive flag data corresponding to the pixel exists, the present exemplary embodiment unifies the color information by integrating the areas remaining after the color conversion.

Accordingly, the present exemplary embodiment can unify the results of the color conversion with respect to the areas having the same color information. With the above-described configuration, the present exemplary embodiment can prevent degradation of the accuracy of area division processing for dividing image data into a text area, a photograph area, and the like, which is executed as post processing. In addition, the present exemplary embodiment having the above-described configuration can improve the quality, visibility, and reusability of an electronic file generated in the above-described manner.

Now, a second exemplary embodiment of the present invention will be described in detail below. In the above-described first exemplary embodiment, the block integration unit 214 executes processing for integrating areas in two mutually adjacent blocks after executing color replacement by using the color replacement unit 213. In the present exemplary embodiment, only areas in one block are focused on. Therefore, the present exemplary embodiment does not integrate areas existing across a boundary between blocks. Components, units, and other configurations similar to those of the first exemplary embodiment are provided with the same reference numerals and symbols. Accordingly, the description thereof will not be repeated here.

In the present exemplary embodiment, image data to be coded is RGB color image data for easier understanding. However, the present exemplary embodiment is not limited to this. More specifically, monochromatic image data or C, M, Y, and K color image data can be coded. In addition, in the present exemplary embodiment, an image includes W pixels in the horizontal (widthwide) direction and H pixels in the vertical (heightwide) direction.

Figure 14:
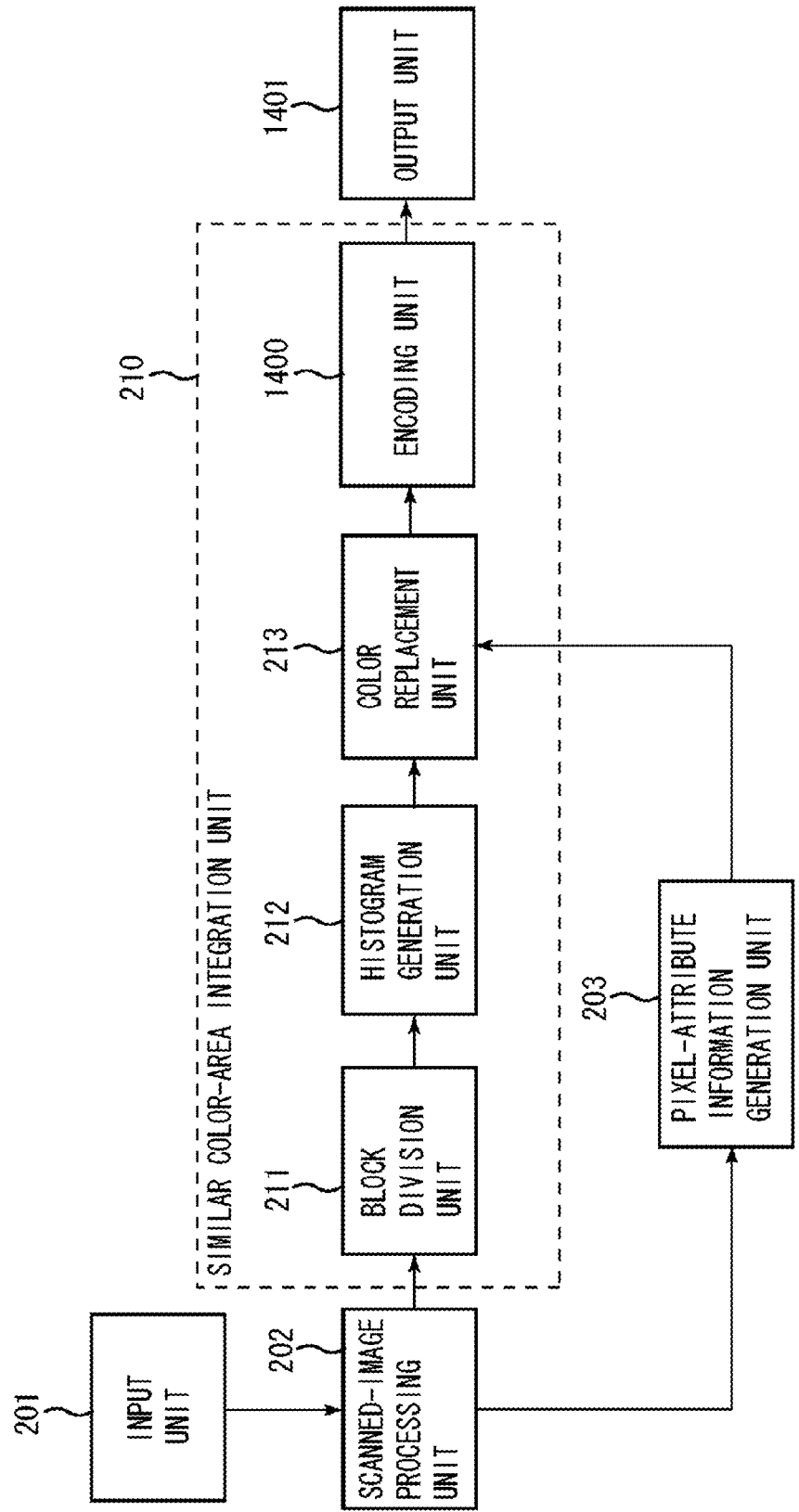
FIG. 14 is a block diagram illustrating an exemplary functional configuration of an image processing apparatus according to a second exemplary embodiment of the present invention.

FIG. 14 is a block diagram illustrating an exemplary functional configuration of an image processing apparatus according to the present exemplary embodiment. The image processing apparatus according to the present exemplary embodiment primarily includes a configuration similar to that of the first exemplary embodiment (FIG. 2) except that the image processing apparatus according to the present exemplary embodiment includes an encoding unit 1400 instead of the block integration unit 214 and an output unit 1401 instead of the image analysis unit 220 and the electronic file conversion unit 204.

In the present exemplary embodiment, it is supposed that image data to be input is image data used in a user mode for processing a document image and image data including a character (text) in an image and computer graphics as a foreground image.

Referring to FIG. 14, the encoding unit 1400 generates coded data based on image data that has been subjected to color replacement by the color replacement unit 213. The run-length encoding method for encoding a continuous number, for example, of a pixel value can be used as an encoding method according to the present exemplary embodiment.

In addition to the above-described run-length encoding method, the following methods can be used. More specifically, lossless compression, which is capable of exactly reconstructing an original still image having a continuous tone, can be used. Furthermore, Lossless JPEG (JPEG-LS) (International Organization for Standardization (ISO)/International Electrotechnical Commission (IEC) 14495-1 and -2), which is an international standard method including an alternative compression method of near-lossless compression that permits a specific level of degradation of image quality during encoding, can be used.

Figure 15:
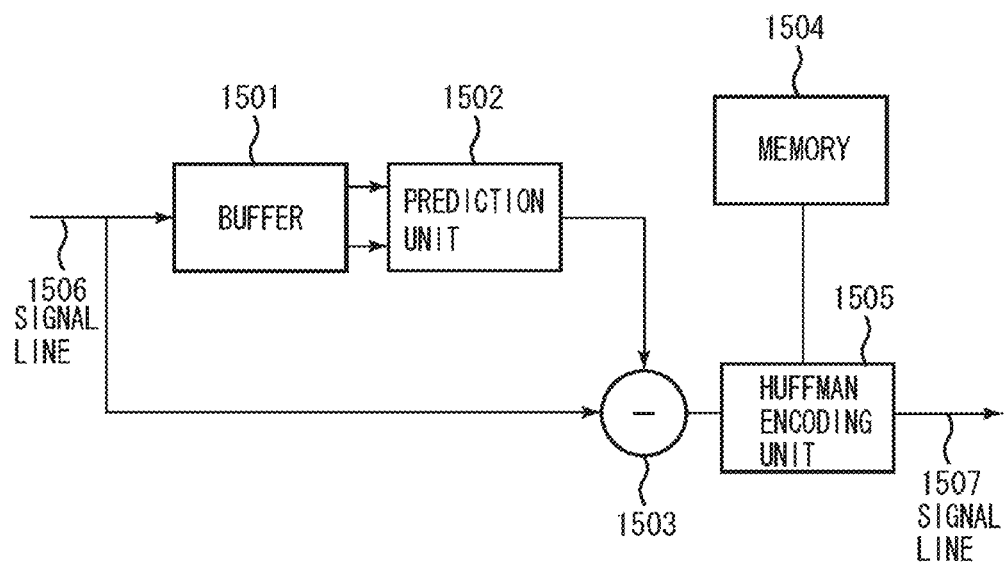
FIG. 15 is a block diagram illustrating an exemplary functional configuration of an encoding unit 1400 according to an exemplary embodiment of the present invention.
Figure 16:
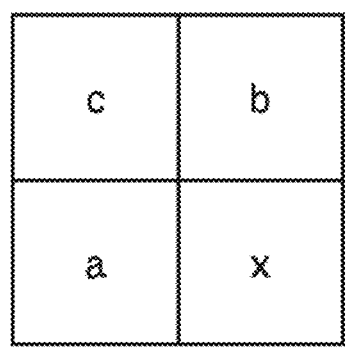
FIG. 16 illustrates an example of tile data according to an exemplary embodiment of the present invention.

FIG. 15 is a block diagram illustrating an exemplary functional configuration of the encoding unit 1400. FIG. 16 illustrates an example of tile data. The present exemplary embodiment uses predictive transform according to peripheral pixels as a sequential transformation method for sequentially transforming image data into a prediction error. In addition, the present exemplary embodiment uses Huffman encoding as an encoding processing method.

The encoding unit 1400 includes a buffer 1501, a prediction unit 1502, a subtracter 1503, a memory 1504, and a Huffman encoding unit 1505.

The buffer 1501 stores the tile data for two lines that is serially input via a signal line 1506. The prediction unit 1502 extracts tile data of a pixel "a", which is located immediately previous to a pixel to be coded, and tile data of a pixel "b", which is located on an immediately previous line, from the buffer 1501. Furthermore, the prediction unit 1502 executes calculation by an expression "p=(a+b)/2". Thus, the prediction unit 1502 generates a prediction value p.

The subtracter 1503 outputs a difference value "e", which is a difference value between tile data "x" and the prediction value "p" of the pixel to be coded. The Huffman encoding unit 1505 refers to a Huffman table previously stored on the memory 1504 and outputs coded data corresponding to the difference value "e" via the signal line 1507.

The memory 1504 previously stores a Huffman table before actually executing the encoding processing. In the present exemplary embodiment, a Huffman table is generated based on the distribution of frequency of prediction errors during prediction coding of a plurality of sample images.

With respect to the distribution of frequency of prediction errors, the frequency tends to become higher as the absolute value of the prediction error becomes closer to a value "0" (i.e., the frequency tends to become lower as the absolute value of the prediction error becomes greater).

Accordingly, as for a Huffman code stored on the memory 1504, a short code word is assigned in a range in which the absolute value of the prediction error is small while a long code word is assigned in a range in which absolute value of the prediction error is great.

FIG. 17 illustrates an example of the Huffman table stored on the memory 1504. As described above, the present exemplary embodiment uses Huffman encoding method. However, the present exemplary embodiment is not limited to this. More specifically, any other method capable of efficiently encoding an image having a small number of colors and a high continuity of pixel values (e.g., a character (text) image and CG) can be used.

If a lossless encoding method is used on an image including a large amount of noise, such as a scanned image, the efficiency of encoding is generally low. Accordingly, in this case, the compression ratio may not be enhanced.

If JPEG-LS is used, it is likely that the pixel values are not continuous. Accordingly, it is highly likely that prediction encoding is executed instead of executing run-length encoding. If prediction encoding is executed, the prediction by the prediction encoding may not presumably be correct. Therefore, in this case, it is necessary to assign a long code word. Accordingly, encoded data may become redundant.

In the present exemplary embodiment, a scanned image stores significant information such as a part of a character (i.e., the above-described flag data) and the value of a pixel located within a block is subjected to tone reduction by the color replacement unit 213 to remove the noise. Accordingly, the continuity of pixel values becomes very high for flat areas. Thus, the present exemplary embodiment can efficiently encode image data by using a lossless encoding method such as run-length encoding.

The encoding unit 1400 inputs coded data generated in the above-described manner to the output unit 1401. The output unit 1401 converts the input coded data into image data and outputs the converted image data to an outside of the system.

The present exemplary embodiment having the above-described configuration executes encoding processing on image data whose tone has been reduced. Accordingly, the present exemplary embodiment can increase the possibility of being capable of executing lossless encoding such as run-length encoding since the present exemplary embodiment can increase the continuity of pixel values as described above.

With the above-described configuration, the present exemplary embodiment can prevent encoded data from becoming redundant. Accordingly, the present exemplary embodiment can execute efficient encoding on an image whose continuity of pixel values is low (i.e., a scanned image including a large amount of noise).

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-217321 filed Aug. 26, 2008, which is hereby incorporated by reference herein in its entirety.

What is claimed is:

1. An image processing apparatus comprising:
an input unit configured to input image data;
an attribute information generation unit configured to generate attribute information about each pixel of the image data input by the input unit;
a division unit configured to divide the image data input by the input unit into a plurality of blocks of a predetermined size;
a generation unit configured to generate a histogram of colors and the number of pixels of each color existing in a focused block divided by the division unit;
a first determination unit configured, if a size of an area having a focused color calculated based on the histogram generated by the generation unit is greater than a predetermined threshold value, to determine that the area having the focused color is a significant area;
a second determination unit configured, if the size of the area having the focused color is equal to or less than the predetermined threshold value, if the area having the focused color is located on a boundary of the focused block, and if the attribute information generated by the attribute information generation unit about successive pixels existing within the area having the focused color and located on the boundary includes a text attribute, to determine that the area having the focused color is a significant area; and
a color replacement unit configured, if it is not determined by either one of the first determination unit and the second determination unit that the area having the focused color is the significant area, to replace a color of the pixel existing within the area having the focused color with a different color so that the color of the area having the focused color becomes the same as the different color of another area within the focused block contacting the area having the focused color,
wherein the color replacement unit does not replace the color of the pixel existing within the area having the focused color determined as the significant area with the different color of another area within the focused block contacting the area having the focused color.

2. The image processing apparatus according to claim 1, wherein the attribute information generation unit is configured to generate the attribute information about a focused pixel based on a result of a determination as to whether a specific area in the vicinity of the focused pixel includes a predetermined or greater number of pixels determined to be edges.

3. The image processing apparatus according to claim 1, wherein the attribute information generation unit is configured to generate the attribute information according to a result of a determination as to whether a focused pixel is included in a text area.

4. The image processing apparatus according to claim 1, further comprising an encoding unit configured to generate coded data based on the image data whose color has been replaced by the color replacement unit.

5. An image processing method comprising:
inputting image data;
generating attribute information about each pixel of the input image data;
dividing the input image data into a plurality of blocks of a predetermined size;
generating a histogram of colors and the number of pixels of each color existing in a divided focused block;
determining, if a size of an area having a focused color calculated based on the generated histogram is greater than a predetermined threshold value, that the area having the focused color is a significant area;
determining, if the size of the area having the focused color is equal to or less than the predetermined threshold value, if the area having the focused color is located on a boundary of the focused block, and if the generated attribute information about successive pixels existing within the area having the focused color and located on the boundary includes a text attribute, that the area having the focused color is a significant area; and
executing color replacement processing, if it is not determined that the area having the focused color is the significant area, on the pixel existing within the area having the focused color with a different color so that the color of the area having the focused color becomes the same as the different color of another area within the focused block contacting the area having the focused color,
wherein in the executing step, the color of the pixel existing within the area having the focused color determined as the significant area with the different color of another area within the focused block contacting the area having the focused color, is not replaced.

6. A non-transitory computer-readable storage medium storing instructions which, when executed by a computer, cause the computer to perform operations comprising:
generating attribute information about each pixel of input image data;
dividing the input image data into a plurality of blocks of a predetermined size;
generating a histogram of colors and the number of pixels of each color existing in a divided focused block;
determining, if a size of an area having a focused color calculated based on the generated histogram is greater than a predetermined threshold value, that the area having the focused color is a significant area;
determining, if the size of the area having the focused color is equal to or less than the predetermined threshold value, if the area having the focused color is located on a boundary of the focused block, and if the generated attribute information about successive pixels existing within the area having the focused color and located on the boundary includes a text attribute, that the area having the focused color is a significant area; and
executing color replacement processing, if it is not determined that the area having the focused color is the significant area, on the pixel existing within the area having the focused color with a different color so that the color of the area having the focused color becomes the same as the different color of another area within the focused block contacting the area having the focused color,
wherein in the executing step, the color of the pixel existing within the area having the focused color determined as the significant area with the different color of another area within the focused block contacting the area having the focused color, is not replaced.

7. The image processing apparatus according to claim 1, further comprising an integration unit configured to integrate a significant area included in a focused block with a significant area included in another block adjacent to the focused block if color information about the significant area included in the focused block is similar to the significant area included in another block adjacent to the focused block.

* * * * *